(12) United States Patent
Rauscher et al.

(10) Patent No.: US 8,611,613 B2
(45) Date of Patent: Dec. 17, 2013

(54) METHOD AND APPARATUS FOR CHECKING PRINT PRODUCTS, A COMPUTER PROGRAM AND A COMPUTER PROGRAM PRODUCT

(75) Inventors: Benedikt Rauscher, Oberursel (DE);
Thomas Caspari, Griesheim (DE);
Hendrik Steinmann, Worms (DE);
Rainer Boenick, Altgarz (DE)

(73) Assignee: Pepperl + Fuchs GmbH, Mannheim (DE)

( * ) Notice: Subject to any disclaimer, the term of this patent is extended or adjusted under 35 U.S.C. 154(b) by 342 days.

(21) Appl. No.: 12/994,258

(22) PCT Filed: May 27, 2009

(86) PCT No.: PCT/EP2009/003775
§ 371 (c)(1),
(2), (4) Date: Nov. 23, 2010

(87) PCT Pub. No.: WO2009/152935
PCT Pub. Date: Dec. 23, 2009

(65) Prior Publication Data
US 2011/0069166 A1 Mar. 24, 2011

(30) Foreign Application Priority Data
May 28, 2008 (EP) .................................... 08009752

(51) Int. Cl.
*G06K 9/00* (2006.01)
(52) U.S. Cl.
USPC ........................................................ 382/112
(58) Field of Classification Search
None
See application file for complete search history.

(56) References Cited

U.S. PATENT DOCUMENTS 4,441,205 A * 4/1984 Berkin et al. ................. 382/151
5,555,313 A * 9/1996 Zheng et al. .................. 382/112

(Continued)

FOREIGN PATENT DOCUMENTS

| EP | 1 156 445 A2 | 11/2001 |
| EP | 1 586 462 A2 | 10/2005 |

(Continued)

OTHER PUBLICATIONS

PCT, "International Preliminary Report on Patentability", International Application No. PCT/EP2009/003775, Date of Completion of this Report Sep. 20, 2010, 7 pages, (English translation provided, see pp. 2-7).

(Continued)

*Primary Examiner* — Nancy Bitar
(74) *Attorney, Agent, or Firm* — Hoffman Warnick LLC (57) ABSTRACT

The invention relates to a method and a device for checking print products of the same kind, more particularly printed sheets of paper of the same kind, which are transported by a conveying device. For this purpose, during a teach-in phase, test images are recorded at a plurality of points on the print product by means of a digital camera. The test images recorded, or parts thereof, are analyzed with respect to their characteristic information, and the test image having the most distinct characteristic information is selected as the reference image. For the purpose of checking print products of the same kind, the subsequent print products of the same kind are checked by recording at least one image at a position corresponding to the reference image and by comparing it with the image data of the reference image. Such checking is carried out by means of a device comprising a digital camera for recording test images of the print product, an illuminating device for illuminating the print product, an input for supplying a position signal, and a control and evaluation unit for controlling the digital camera and the illuminating device and for analyzing image data produced by the digital camera. The invention further relates to a computer program and to a computer program product.

18 Claims, 7 Drawing Sheets

(56) References Cited

U.S. PATENT DOCUMENTS

| | | |
|---|---|---|
| 6,264,105 B1 | 7/2001 | Longacre, Jr. et al. |
| 7,388,688 B2 * | 6/2008 | Yamazaki et al. ............ 358/1.9 |
| 7,643,181 B2 * | 1/2010 | Haas et al. .................. 358/3.28 |
| 2002/0018655 A1 * | 2/2002 | Krabb ......................... 396/661 |
| 2003/0081813 A1 | 5/2003 | Astle |

FOREIGN PATENT DOCUMENTS

| | | |
|---|---|---|
| EP | 1 715 441 A2 | 10/2006 |
| JP | 57196375 | 12/1982 |
| JP | 3224074 | 10/1991 |
| JP | 2001506820 | 5/2001 |
| JP | 2004136585 | 5/2004 |
| JP | 2005047288 | 2/2005 |
| JP | 2005208717 | 8/2005 |

OTHER PUBLICATIONS

Michiel Sonius, "International Search Report", Application No. PCT/EP2009/003775, Date of Mailing: Sep. 30, 2009, 6 pages.

* cited by examiner

METHOD AND APPARATUS FOR CHECKING PRINT PRODUCTS, A COMPUTER PROGRAM AND A COMPUTER PROGRAM PRODUCT

FIELD OF THE INVENTION

The invention relates to a method and an apparatus for checking print products, more particularly printed sheets of paper of the same kind that are transported by a conveying device.

RELATED ART

The invention further relates to a computer program and a computer program product.

A method for verifying print products for bookbinding machines is disclosed in the documents EP 1 586 462 A2 and EP 1 715 441 A2. For verification of print products for bookbinding machines, it is essential to verify and identify the correct sequence of the print products. This is carried out in known manner by means of digital cameras and by recognizing successive identification marks on the differently printed sheets of paper. Printed images that differ from sheet to sheet of paper to be fed to a bookbinding machine in a precisely predetermined sequence can also serve as the identification marks. The corresponding teach-in (i.e., learning) and verification programs require high engineering and programming effort for this purpose. Additionally, they require rapid access to an extensive amount of stored information in order to continue the recognition of the correct sequence within the machine cycle and to prevent sequence errors which might cause the bookbinding machines to be shut down when sequence errors occur.

However, with many print products it is not necessary to determine a correct sequence by means of a plurality of different, possibly successive identification marks. It is sufficient to verify the similarity of the print products and to ensure the similarity and positional conformity of the same before they are fed to a bookbinding machine, a catalog-pasting machine or a magazine stapler. In fact, in post-processing of print products or in the packaging industry, there occur problems when similar print products to be processed are not fed correctly to a relevant machine. The results are that bookbinding machines bind blank pages, collating machines gather the pages falsely orientated, folding machines fold and cut the wrong sheets of paper, or packaging machines insert the wrong packing slips into, say, medicine boxes.

A solution known in the prior art consists of printing identification codes on the edges of the print products. The codes may if desired be cut off after the binding or folding process. A reader is integrated in the machine, and the scanned codes are compared with predefined values. A disadvantage of this method is the necessity to print the codes beforehand on each sheet or each print product, which codes involve additional effort and, moreover, cannot always be applied to said products.

SUMMARY OF THE INVENTION

It can be regarded as an object of the invention to check the similarity and positional conformity of print products in the teach-in phase and in the verification or checking phase with the least possible expenditure of time for verification. It may be regarded as a further object of the invention to reduce the number of print products of the same kind that need be provided for the teach-in phase. Finally, it is an object of the invention to provide an apparatus that is suitable for the method. A further aim is to provide a suitable computer program.

This object is achieved by the subject matter of the independent claims. Preferred developments of the invention are revealed in the dependent claims.

According to the invention, a method and an apparatus are provided for checking print products of the same kind, more particularly printed sheets of paper of the same kind that are transported by a conveying device. For this purpose, test images are recorded by a digital camera at a plurality of points on the print product in a teach-in phase. An evaluation region having an area smaller than, or equal to, the test image is then defined within each test image. Each evaluation region is analyzed for its characteristic information. The test image in which the evaluation region has the most distinctive characteristic information is then selected as the so-called reference image.

A check image of each print product is created for checking successive print products of the same kind. The position of this check image corresponds to the position of the reference image on the print products. The similarity and positional conformity of the subsequent print product relative to the print product for which the reference image has been produced are verified by an image-data comparison at least of a subregion of the check image with the evaluation region of the reference image.

Such checking is carried out by means of an apparatus of the invention that comprises a digital camera for creating test images of the print product, an illuminating device for illuminating the print product, an input for the supply of a position signal, and a control and evaluation device for controlling the digital camera and the illuminating device and for evaluating image data provided by the digital camera.

It is a fundamental concept of the method of the invention to determine a region on the print product that is highly suitable for carrying out a quality check of subsequent print products. The term "quality check" can, for the purposes of the invention, be understood to mean verification of the similarity and positional conformity of the subsequent print products relative to the print products that have been analyzed during the teach-in phase. This region determined on the print product is suitable for carrying out a quality check, particularly by comparing it with subsequent print products, if this region makes it possible to draw relatively reliable conclusions on the quality of the print product examined with relatively low processing effort. In other words, a reference image comprising an evaluation region is selected in the teach-in phase, based on which reference image it is possible to determine a true/false signal following the checking process within a fraction of a second. In the case of a false signal, an error signal can then be outputted at an output of the control and evaluation device.

In order to determine the reference image that has the most suitable evaluation region, the characteristic information of the evaluation region of each test image is determined. The test image or the evaluation region thereof that contains the most distinctive characteristic information is then selected as the reference image. Various methods are suitable both for determining and for evaluating the characteristic information. It is important that the information be determined rapidly and with the least possible computing power, since the method of the invention and the apparatus of the invention are used in real-time environments.

One way of determining and evaluating the characteristic information is to divide the evaluation region of each test image into a number of subregions and to analyze each subregion for its characteristic information. One advantage of this is, inter alia, that for the purpose of determining characteristic information it is more favorable, depending on the selection of said information, to determine the characteristic information for a plurality of subregions instead of for the entire evaluation region. For example, the number of edges represents one option for determining and evaluating characteristic information. The term "number of edges" can be understood to mean the number of contrast changes between bright and dark. It is likewise possible to determine data concerning the contrast value, the contrast distribution, the brightness histogram, the average gray value, or the mean of the gray values.

Preferably, the evaluation region is divided into $n^2$ square-shaped subregions, for example, into 16 or 25 subsquares, where n is a positive integer. Regarding a square-shaped evaluation region, this constitutes a simple and yet adequate way of division.

In principle, it is preferable when the fewest possible process steps are carried out during the teach-in phase since otherwise the teach-in phase were prolonged. If, for example, the presence of the maximum number of possible edges in a subregion of the evaluation region would be advantageous for subsequent checking of the subsequent print products, then it can suffice to determine only the number of edges in each subregion when determining the characteristic information of each subregion. Another type of characteristic information such as the mean gray value can be computed, for example, when it is determined that the number of edges in a subregion is too low.

Provision is made, in an advantageous embodiment of the method of the invention, for example, to compare each subregion of the evaluation region of the reference image with the respective corresponding subregions of the check image for checking subsequent print products. This comparison can be carried out, for example, by means of a correlation of the two subregions. However, since the correlation delivers a sufficiently reliable result only in the case of a sufficiently large number of edges, it is preferable to define a threshold for the number of edges. If a subregion of the evaluation region has more edges than that defined by the threshold, the subregion, that is, the image information thereof, is suitable for a comparison based on correlation. If the number of edges is below the threshold, an additional comparative variable can be determined that can be used in addition to, or instead of, the comparison based on correlation. The gray-scale mean is advantageous for this purpose, for example. Thus for an evaluation region, there results a varying number of subregions that can serve for comparison based on correlation and a number of subsquares that are suitable merely for gray-value comparison.

It is thus advantageous when the test image or the evaluation region thereof that has the maximum number of subregions having a number of edges exceeding a defined threshold is determined as the reference image. In other words, the test image having the maximum number of subregions suitable for comparison with the subsequent subregions by means of correlation is selected.

In an advantageous embodiment of the method of the invention, a reference pattern is determined in the evaluation region of either each test image or only of the reference image. For this purpose, a plurality of test patterns that are each checked for their suitability as a reference pattern can be defined in the evaluation region. These test patterns may overlap each other. In other words, a stencil that leaves only one test pattern open is placed over the evaluation region when looking for a suitable reference pattern. This stencil is moved over the entire evaluation region so that many different test patterns are produced, each of which is then evaluated. The most suitable test pattern is then selected as the reference pattern.

In principle, the reference pattern can be analyzed and selected using arbitrary evaluation methods. However, it is advantageous when the reference pattern is distinguished from the other examined test patterns by a good recognition value. For example, it can have the maximum or an optimal number of edges. Furthermore, the number of edges can be examined at a defined contrast level, for example the strongest or most suitable contrast value. Additionally, the selected reference pattern in the evaluation region must be sufficiently distinct to enable it to be later recognized with precision on the subsequent print products.

In order to make it possible to carry out a reliable quality check of the subsequent print products, an optimum exposure time is determined in the teach-in phase. For the purposes of the invention, the term "optimum" can be understood to mean that this exposure time will enable the subsequent processing and computation steps for determining the reference pattern and the like to be carried out with maximum ease and reliability. For this purpose, for example, test images of the print products can be produced using different exposure times or shutter times. These test images should each represent the same area of the print products. The test images can be compared and thus an exposure time determined that can be used in the further course of the method, the determination of which being based on a parameter determined for each test image. The histogram of the test image may be advantageously used for this purpose, wherein a uniform distribution or a shift toward brightness can be regarded as very advantageous, for example.

If a one-dimensional or multidimensional bar code is present on the test images to be examined in the search for a reference pattern, it is preferred for the reference pattern to be selected such that the bar code is located within the reference pattern. Depending on the evaluation method used for determining the reference pattern, this can be carried out without further effort by way of the underlying selection parameters or by means of an additional analysis of all test patterns for a bar code by any of the known methods.

When producing the test images supplied for subsequent processing, it is preferred that they have a substantially symmetrical arrangement in terms of their number and position. This symmetry can be in relation to both the center axis and the transverse axis of the print product. An axially symmetrical distribution of the test images relative to both axes is also possible. In order to achieve a substantially symmetrical distribution, it is preferable to determine the length of the print product by means of a photoelectric barrier. Furthermore, the conveying speed should also be determined so that it can be used for determining the time intervals for the production of the test images.

For the purpose of obtaining a reliable quality check of the subsequent print products, it is advantageous when the evaluation region in the check image corresponds to the evaluation region in the reference image. The evaluation region in the check image need not exactly match the evaluation region in the reference image in terms of position, within defined tolerance ranges. However, since a slight positional deviation of the evaluation region would greatly affect further comparison, the evaluation region of the test image is advantageously readjusted. For this purpose, the reference pattern defined beforehand is looked for in the test image. This reference pattern and thus also the position thereof can be unequivocally determined by definition. Furthermore, the position of the evaluation region relative to the reference pattern was determined when defining the reference pattern. As a result, it is now possible to align the evaluation region with its subregions on the test image with reference to the reference pattern so that accurate positioning is possible.

For the purpose of achieving a correct flow of the teach-in phase and of the subsequent checking phases, some constants are initially defined for the method. For example, the aforementioned threshold for deciding for a correlation evaluation or a grayscale comparison is determined prior to the teach-in phase. Furthermore, the time at which a comparison delivers a positive or a negative result is also determined before carrying out the method. This must be defined for each comparison method used. Moreover, a minimum positional tolerance in the x and y directions is also defined prior to the teach-in phase, the x direction indicating the position of the print product to be checked in the direction of transport, and the y direction indicating the position of the print product in a direction extending transversely to the direction of transport. Furthermore, the number of comparisons of subregions that would have to be faulty in order to indicate an erroneous print product is also to be defined.

In a preferred embodiment of the method, the teach-in phase is automatic and self-optimizing, the length of a print product being initially detected by means of photoelectric barriers. Thereafter, a limited number of exposure times or shutter times s can be tested automatically for optimizing the exposure time. If, for example, three different exposure times s=3 are required for the automatic optimization of the exposure time, then only one additional print product is required in order to acquire the number and position of the possible test squares on the print product in the direction of transport.

For this purpose, the test squares can be disposed optimally and symmetrically on the print product, such as a sheet of paper printed in similar manner.

An apparatus for checking print products of the same kind, more particularly printed sheets of paper of the same kind, comprises a digital camera for recording test images of the print product. Furthermore, the apparatus comprises an illuminating device for illuminating the print product. Finally, the apparatus can comprise an input for supplying a position signal in order to determine or verify the position of a check image relative to the edge of the print product. Furthermore, the apparatus comprises a control and evaluation unit for controlling the digital camera and the illuminating device and for analyzing image data provided by the digital camera.

As mentioned above, the control and evaluation unit, together with the illuminating device and the digital camera, are configured so as to carry out a teach-in phase, in which test images are created by the digital camera at a plurality of points on the print product. The evaluation unit serves to analyze the evaluation regions of the resulting test images for their characteristic information. Furthermore, the evaluation unit makes it possible to select a test image having the most distinctive characteristic information as the reference image. Finally, the evaluation unit serves to check subsequent print products of the same kind by means of check images created at positions corresponding to the position of the reference image, and by comparing the resulting check images with the image data of the evaluation region of the reference pattern.

The advantage of this apparatus is that it makes it possible to verify similar print products with reasonable technical effort and in a period of time that can be adapted to the machine cycle.

The illuminating device preferably comprises a light emitting diode array, in which light emitting diodes or laser diodes are disposed in rows and columns. This light emitting diode array ensures that a uniform illumination of subsquares in the verification square is obtainable. Furthermore, optimization and adaptation of the exposure times or shutter times s to give optimum illumination having optimum contrast values and the possibility of obtaining clear results for determining the number of edges are achieved in the teach-in phase. The illuminating device can additionally comprise four laser diodes at the four corners of the illuminating device that visibly delimit the field of illumination on the print product.

Furthermore, the apparatus can comprise at least one device for determining the position of the print product on the conveyor belt, which position-determining device in turn comprises at least one photoelectric barrier that detects an edge of the print product on the conveying device in the direction of transport. The photoelectric barrier can also detect the overall length of the print product in the direction of transport and also its extension in a direction extending transversely to the direction of transport by means of appropriate additional photoelectric barriers. It is possible, with the help of the photoelectric barriers, to automatically arrange the test images provided in the teach-in phase in a substantially uniform and symmetrical manner on the print product in the direction of transport.

In a further preferred embodiment of the invention, the apparatus comprises a press-down device for pressing the print product down onto the conveying device at least in the region of the check image to be detected within the imaging range of the digital camera. This press-down device can comprise a compressed-air nozzle and can thus press the print product against a surface of the conveying device and thus increase or ensure the sharpness of the images produced by the digital camera.

Each of the individual method steps described in this context can represent an individual separate concept of the invention. It is therefore also in accordance with the invention to carry out the steps in a different order, singly, or with the omission of some of the steps.

The computation and evaluation steps of the method of the invention are preferably carried out on a computer in the form of a computer program.

This computer program can be stored in a manner known per se on a machine-readable data carrier such as a ROM of a microcontroller or a programmable logic device.

BRIEF DESCRIPTION OF THE DRAWINGS

The invention is now explained in greater detail with reference to the attached figures.

FIGS. 3 to 7 are diagrams for illustrating individual method steps during a teach-in phase;

FIGS. 8 to 11 are diagrams of individual method steps of an automatic teach-in phase;

DETAILED DESCRIPTION OF THE INVENTION

Figure 1:
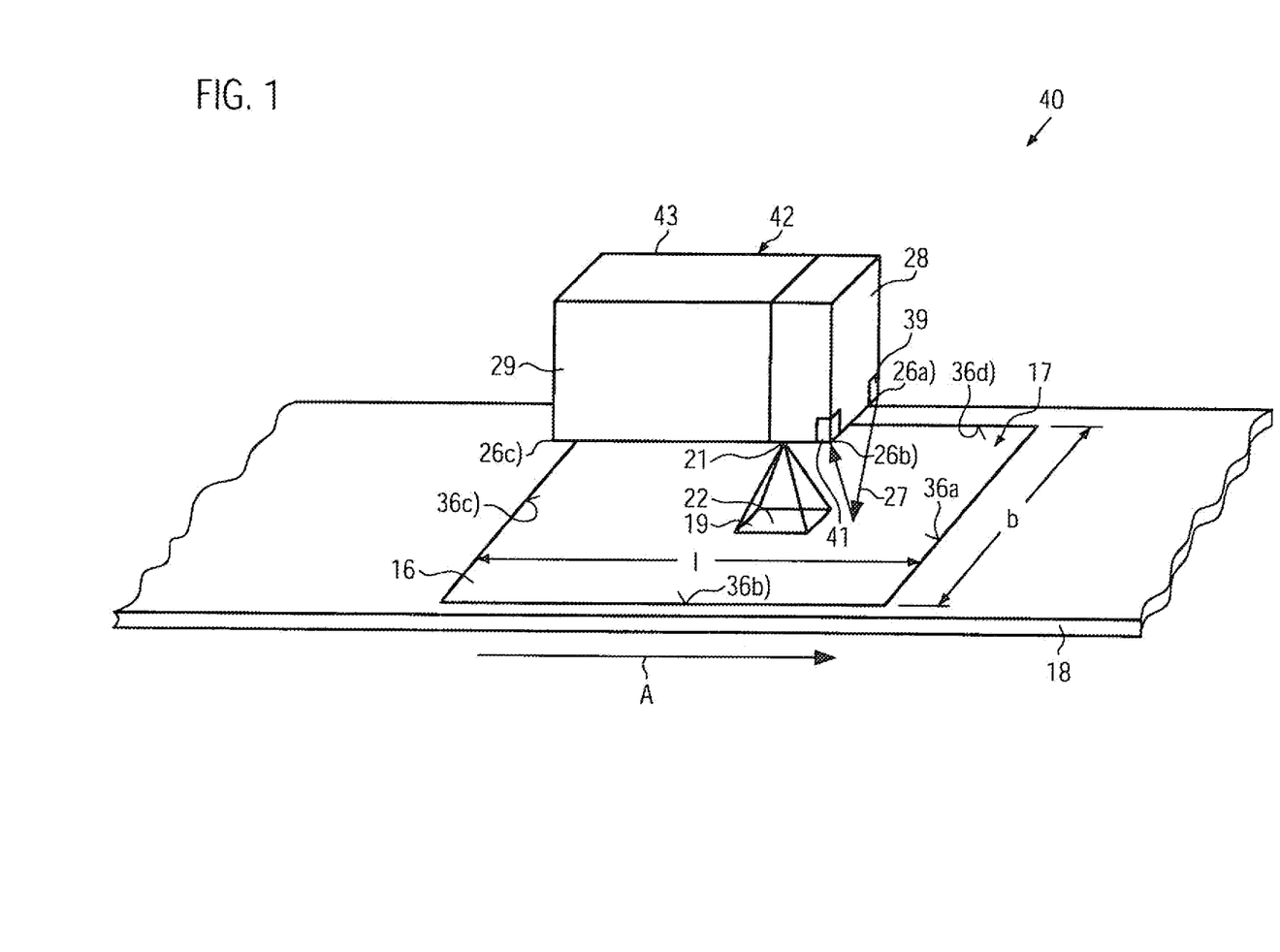
FIG. 1 is a diagrammatical perspective view of an apparatus for checking print products according to the invention.

FIG. 1 is a diagrammatical perspective view of an apparatus 40 for checking print products 16 according to the invention. This apparatus 40 comprises a sheet-identification sensor 42 referred to hereinafter as BIS. BIS 42 comprises an imaging chip in the form of a digital camera 21 comprising an optical system, an illuminating device 29, and an evaluating computer in a control and evaluation unit 28. In this embodiment of the invention, BIS 42 including the illuminating device 29, the digital camera 21, and the evaluating computer is accommodated in a common sensor housing 43.

BIS 42 is integrated in, or mounted on, a machine for transporting print products in such a way that the print products 16, in the form of sheet of papers 17 to be checked, are guided past BIS 42 in the direction of transport A, the print product 16 being imaged by the digital camera 21 at various points 19. For this purpose, the print product 16 is located on a conveying device 18 that is moved in the direction of transport A. An edge 36a) of the print product is detected by a trigger sensor in the form of a photoelectric barrier 27 that comprises a laser transmitter 39 and a corresponding receiver 41 at the front corners 26a) and 26b) of the housing 43 respectively.

The conveying speed for transporting print products in the direction of transport A can be measured with the help of this photoelectric barrier 27 in conjunction with a rotary-encoder signal from the machine. In BIS 42, the rotary-encoder pulses are counted after the activation of the trigger sensor in the form of a photoelectric barrier 27, and a test image 22 is produced after a predetermined number of pulses. Thus an image detail can be moved arbitrarily on the print product 16 in the direction of transport, and the position of the test image 22 relative to the edge 36a) of the print product 16 can be determined.

The image analysis is carried out by the control and evaluation unit 28 within the machine cycle so that sufficient monitoring is carried out by the apparatus of the invention even at maximum operating speeds. Apart from providing the analysis of data of the test image 22, BIS 42 also comprises software for reading codes, preferably bar codes that may be disposed arbitrarily along the length l or the width b of the print product 16 within the range of detection of BIS 42. Preferably, the test image 22 is selected such that the bar code is located within the image.

Figure 2:
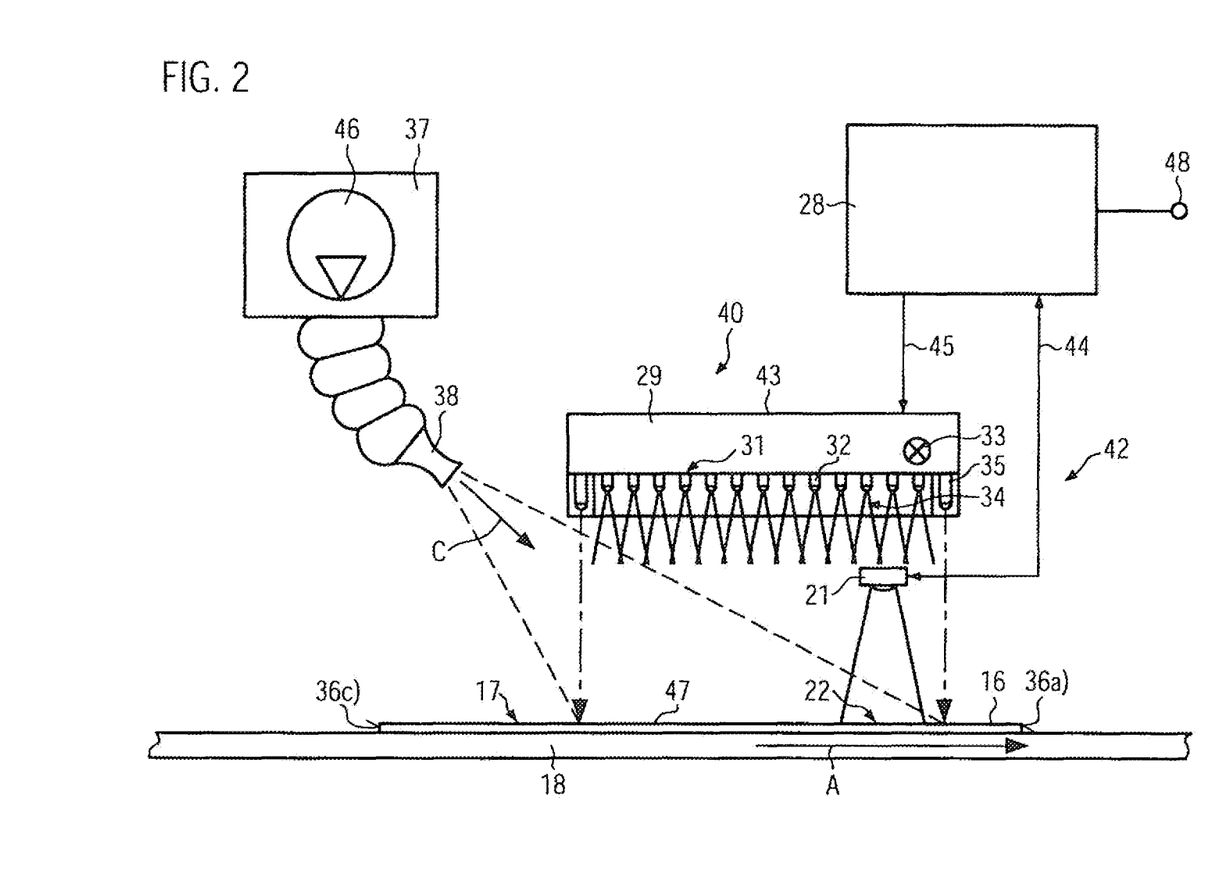
FIG. 2 is a diagram of the embodiment shown in FIG. 1.

FIG. 2 is a diagram of the embodiment shown in FIG. 1. In this diagram, components such as the digital camera 21, the illuminating device 29, and the control and evaluation unit are shown as blocks that are linked together by means of appropriate interfaces 44 and 45 or bus lines. The illuminating device 29 comprises a light emitting diode array 31, of which the light emitting diodes 32 are disposed in rows 33 and columns 34. Laser diodes 35 are disposed at the corners of the housing of the illuminating device 29 in order to display the borders of the illuminated area of a test square to be examined on the print product 16 in a teach-in phase or on a checking square in a checking phase. This display is not required for carrying out the method of the invention but merely serves as a display for the personnel monitoring the conveying device.

In addition to the components explained with reference to FIG. 1 that are denoted by the same reference numerals in FIG. 2, this diagrammatical representation further shows a press-down device 37 comprising a compressor 46 that blows compressed air through a compressed-air nozzle 38 onto the illuminated region of the print product 16 in the direction of the arrow C and thus causes the print product 16 to be pressed down onto the conveying device 18 in order to achieve a preset distance between the digital camera 21 and the surface 47 of the print product. The optical system of the digital camera or of the imaging chips thereof is adjusted to this distance so that sharp images can be generated.

By means of an apparatus 40 of the invention, it is possible for BIS 42 to check the quality such as the position, imprint and similarity of the print product 16 to the test image 22 without requiring a code to be additionally printed on the print product. For this purpose, a characteristic detail of the test image can be taught to the sensor at the start of production. All additional print products 16 of a similar kind are then compared with the taught-in template, and a corresponding "false signal" is emitted as the output signal at the output 48 of the control and evaluation unit 28 in the case of print products deviating from the template.

To this end, the method used for comparison is based on a test image stored during the teach-in phase and comparison parameters determined therefrom. This test image is then referred to as a reference image, and an evaluation region of the entire image is used for the purpose of comparison. During the inspection of the print products 16, for example, one or more verification images of each sheet of paper are recorded and these verification images are compared with the taught-in evaluation region of the reference image while allowing for the comparison parameters.

The tolerance of the method with respect to, for example, changes in the position or in the brightness of the print product can be controlled by means of appropriate comparison parameters. Individual method steps during a teach-in phase are explained below with reference to FIGS. 3 to 7.

Figure 3:
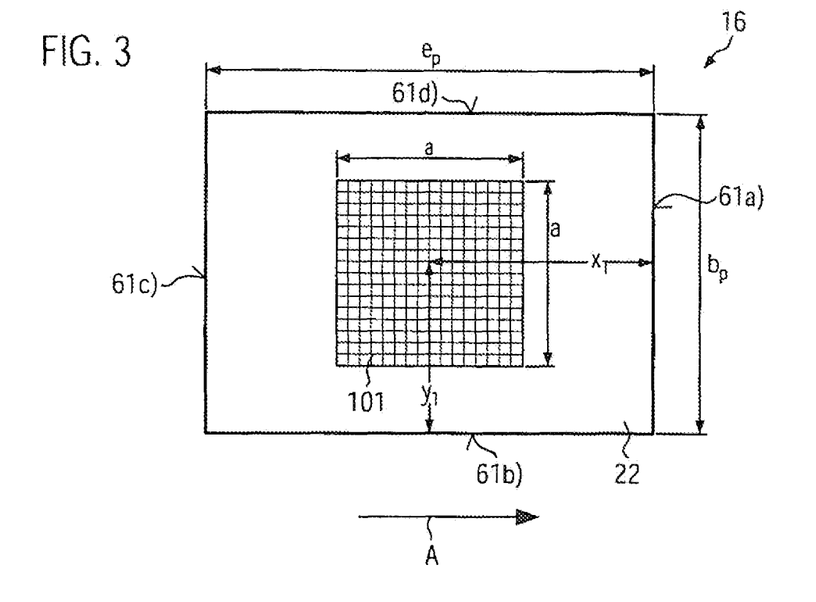
FIG. 3 is a diagrammatical view of a test image.

For this purpose, FIG. 3 shows a diagrammatical view of a test image 22 of length $l_P$ and width $b_P$. This test image 22 shows a subpart of a print product 16 lying on the conveying device 18. The size of the test image 22 is governed by the imaging chip used in the digital camera 21. The test image is illuminated by the aforementioned illuminating device 29.

Within the test image 22, an evaluation region 101 located preferably at the center is defined. Here, this evaluation region 101 has the shape of a square having the edge length a. The evaluation region 101 can be disposed at the center, as shown in FIG. 3, at a distance $x_1$ from the edge 61a) and $y_1$ from the edge 61b) of the test image 22.

Figure 4:
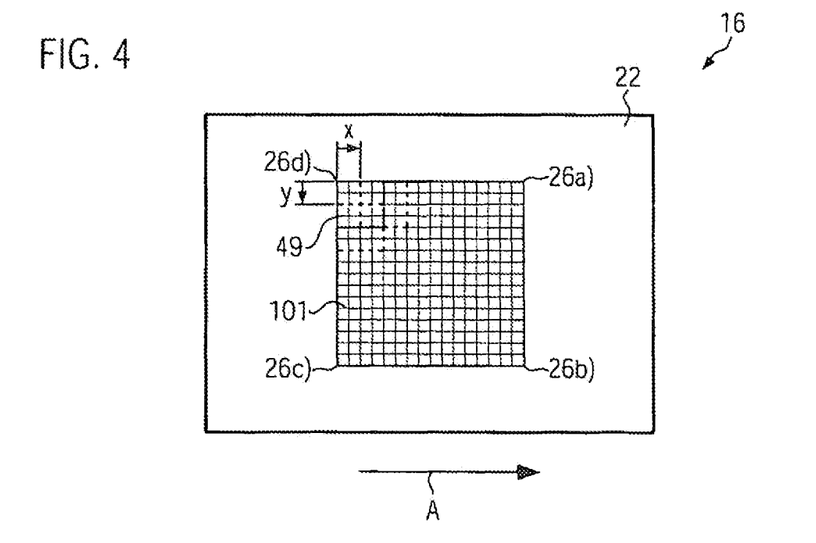
FIG. 4 is a diagrammatical view of the test image shown in FIG. 3 when determining a reference pattern.

FIG. 4 is a diagrammatical view of a test image, as shown in FIG. 3, during the determination of a reference pattern 25. A suitable template is sought within the evaluation region 101 in FIG. 4 for stable operation of the identification process. This means that a test pattern 49 is selected as a reference pattern 25 within the evaluation region 101, which test pattern should be clearly and relatively easily recognizable. A square test pattern is looked for in the present example. However, other shapes of test patterns are also possible that are sufficiently well-defined in terms of the resolution of the camera. A region having a predetermined size is moved virtually across the entire evaluation region. A plurality of different test patterns is thus defined. The number of edges and the maximum contrast range are detected for each test pattern thus determined. The test pattern comprising a maximum number of edges at maximum contrast is then defined as the reference pattern 25.

Figure 5:
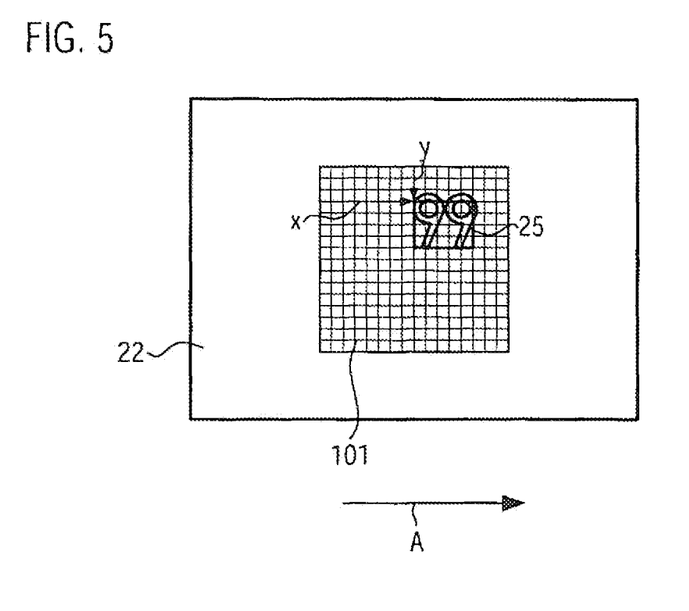
FIG. 5 is a diagrammatical view of a test image and a determined reference pattern.

FIG. 5 is a diagrammatical view of a test image 22 and a reference pattern 25 determined within the evaluation region 101. This reference pattern 25 appears only once in the evaluation region 101 of the test image 22. The top left-hand corner of the reference pattern 25 is located at the x and y coordinates that originate from the top left-hand corner of the evaluation region 101. The reference pattern 25 is highlighted here by the numeral 99 on the print product 16.

Figure 6:
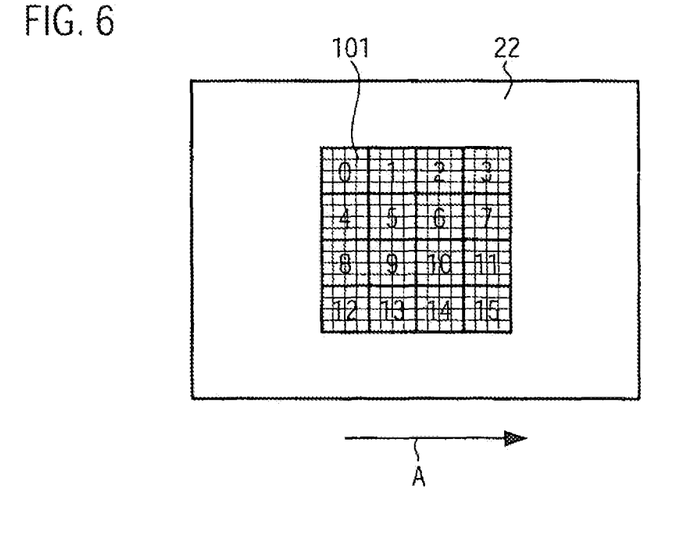
FIG. 6 is a diagrammatical view of a test image comprising an evaluation region divided into subregions.

FIG. 6 is a diagrammatical view of a test image 22 comprising an evaluation region 101 that is divided into sixteen subregions 0 to 15. Here, the subregions have a basically square shape so that they may also be referred to as subsquares 0 to 15. However, they might have any other shape, as in the case of the test patterns. The subsquares 0 to 15 are used when verifying the similarity and positional conformity of the print product 16. The number of subsquares can be $n^2$ and is not limited to sixteen, as is the case in FIG. 6. It is possible for a smaller or larger number of subsquares to be defined in a corresponding evaluation region 101. The number of edges and/or a contrast value are determined for each subsquare in the teach-in phase. The number of edges and the contrast value can vary from subsquare to subsquare and there may also be subsquares that do not contain any significant features or image data. These subsquares mostly have no edges or only a small number of edges.

The values determined for the individual subregions are then evaluated in order to ascertain whether the test image 22 with its evaluation region 101 is suitable for a quality check of the print product 16. This process is now described below with reference to FIG. 7.

Figure 7:
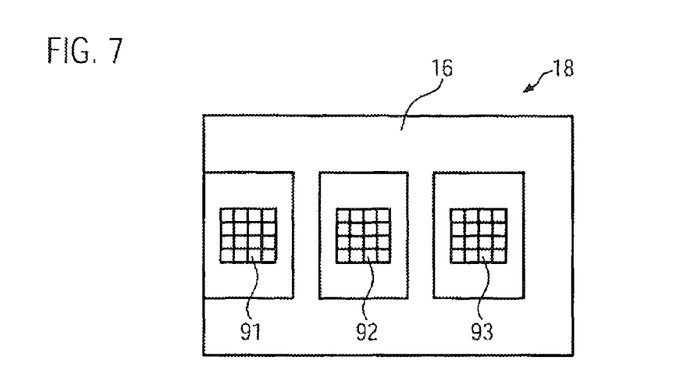
FIG. 7 is a diagrammatical front view of a print product comprising a plurality of test images.

FIG. 7 accordingly shows a diagrammatical front view of a print product 16 comprising a plurality of test images 91 to 93. This will represent a considerable source of errors when a user is to carry out such a teach-in phase manually, particularly if a larger number of such BIS sensors is present in a machine. It is therefore advantageous when the sensor independently evaluates suitable test images, at least in the direction of transport A, in order to define a suitable test image as the reference image. As described with reference to FIG. 6, the number of edges is determined for each test square. The more edges a test square has, the more suitable it is for the quality check, since clear conclusions regarding quality can be made in the case of correlation with a corresponding test square on a subsequent print product to be verified. The test squares that only have a number of edges lying below a defined threshold cannot supply any significant data for the correlation. The gray-scale mean is therefore computed for these squares and this gray-scale mean is compared with the corresponding test square on the subsequent print products to be verified. The number of test squares suitable for a comparison based on correlation depends on the test image 91, 92, 93 selected. In the teach-in phase, if possible several test images 91, 92, 93 are therefore produced from a print product and these are then evaluated for their suitability for the quality check. In this case, the test image 91, 92, 93 that has the maximum test squares having a number of edges exceeding the threshold value is selected as the reference image, since these test squares are suitable for the preferred method of comparison by means of correlation.

Figure 8:
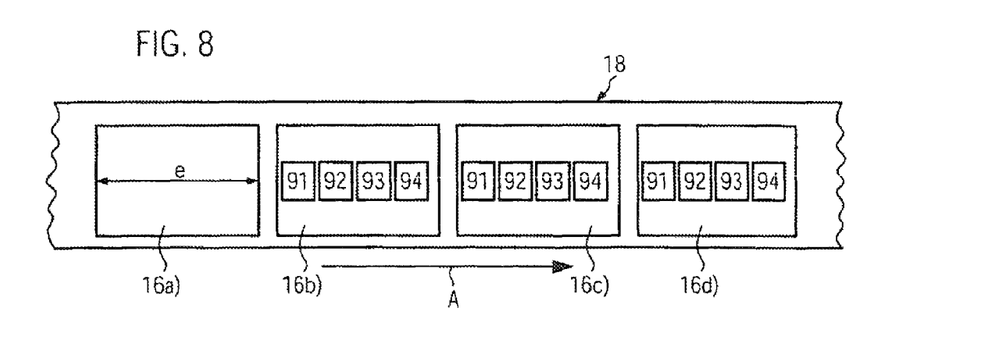
FIG. 8 shows four print products and illustrates the method carried out using the same.

FIG. 8 shows four print products 16a), 16b), 16c), and 16d) on a conveying device 18 and serves to illustrate the automatic distribution of test images on print products, the conveying device 18 being moved in the direction of transport A for such an automatic teach-in phase, and BIS not being disposed transversely to the direction of transport A so that a central position is assigned here to all of the test images 91 to 94 concatenated on the respective print product 16. In this automatic teach-in phase, only the length l of the print product is initially automatically determined by means of the print product 16a) in that suitable photoelectric barriers of the BIS are activated in cooperation with the machine drive. The points in time at which a print product reaches and leaves the photoelectric barrier, are known from the signals emitted by the photoelectric barrier. The length of a print product can be determined, since the speed of travel of the conveyor belt is additionally known to the apparatus 40 of the invention. It is merely necessary for the print product 16a) to be transported past the apparatus 40. The test images 91, 92, 93, and 94 are then uniformly created on the basis of the length l of the subsequent print products 16b), 16c), and 16d).

The exposure time is optimized in these three further pieces of print products 16b), 16c), and 16d). The exposure time in the case of the print product 16b) is so long that there is hardly any contrast and no structure is visible in the test images 91 to 94. In the print product 16c), average exposure time or shutter time s is set such that clear gray-scale means are obtained, and it is possible to define subsquares having a corresponding larger or smaller number of edges in the test images 91 to 94. Finally, the exposure time or shutter time s in the case of a third print product 16d) is reduced to such an extent that the test squares 91 to 94 appear in the dark to be of low contrast which is illustrated by a clearly darker background in FIG. 8. An optimal shutter time s for the print product to be checked is determined on the basis of the different test images created for the different print products 16b), 16c) and 16d).

Figure 9:
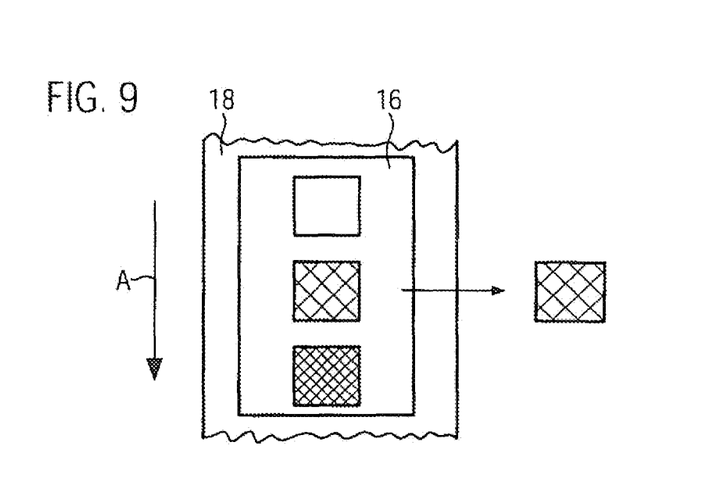
FIG. 9 is a simplified representation of a print product comprising test images that are created using variably long exposure times.

This is represented diagrammatically for various test images on a print product 16 in FIG. 9. Here again, the different degrees of brightness are shown that are produced as a result of different shutter times s. In the embodiment of the invention illustrated here, the number of pieces of print products necessary for a teach-in phase can be further reduced in that the three different exposure times as used on three different print products in FIG. 8 are now used only on one print product 16, in which case the medium exposure time results in the highest contrast value and is thus used for additional examinations in the teach-in phase and also in the checking phase. This method can be used, in particular, when rapidly recurring patterns are printed on the print products so that substantially the same printed regions are shown in each test image.

Figure 10:
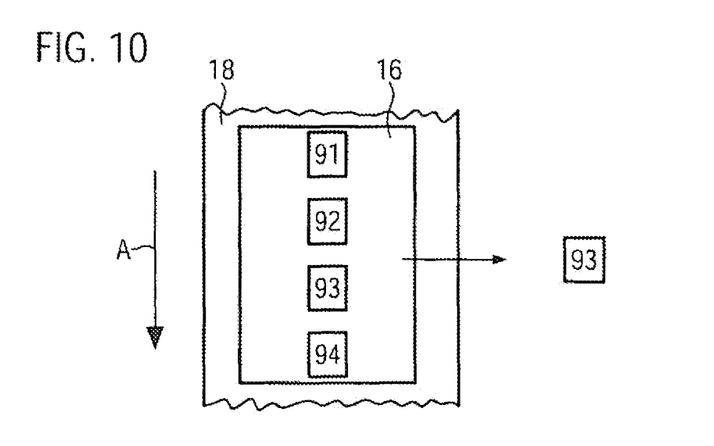
FIG. 10 is a diagrammatical front view of a print product comprising four test images.

FIG. 10 shows a diagrammatical front view of a print product 16 comprising four images 91 to 94 that are now examined for different evaluable image data after an optimal exposure time has been set. In this case, the test image in which the maximum number of subregions 0 to 15 having a number of edges exceeding the defined threshold value is located in the evaluation region 101, is defined as the reference image, as explained with reference to FIG. 6.

Figure 11:
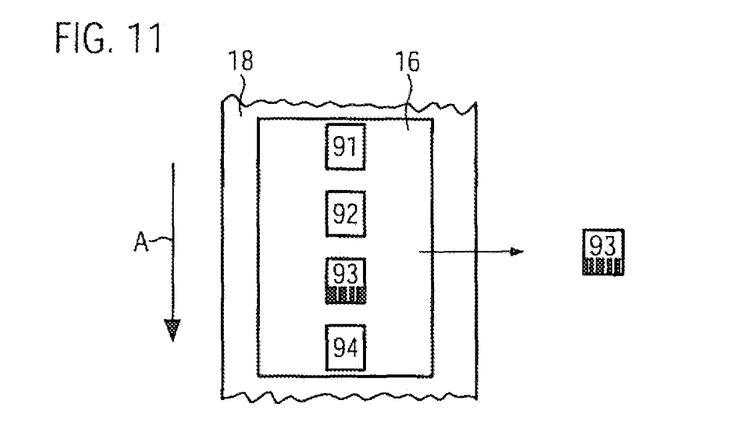
FIG. 11 is a diagrammatical front view of a print product that additionally comprises bar-code markings.

In FIG. 11, a bar code 24 is present in the region of the test image 93 on the print product. This bar code is recognized as bar code 24 in the test image 93 so that this test image 93 is defined as the reference image, since the similarity and positional accuracy of the subsequent print products can be verified very well by means of a bar code 24.

Thus the teach-in process includes the steps of determining the length of the print product, determining the optimal exposure time, determining the reference image, and finding the reference pattern in the evaluation region of the reference image. Some of these steps can be carried out in a different order or some can be carried out simultaneously.

Figure 12:
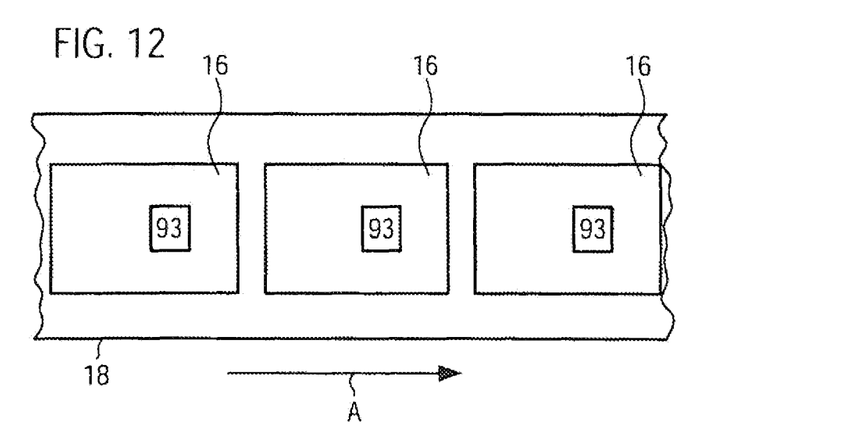
FIG. 12 shows three print products for illustration of the verification phase.

FIG. 12 serves to illustrate the checking method on conclusion of the teach-in phase. This checking phase is carried out by means of a single check image 93 for each print product 16. By means of this reference image defined following the teach-in phase, an optimum economy of time is achieved in the actual steps carried out for checking the similarity and positional conformity of the print products to be verified in that comparison is only carried out between the subsquares 0 to 15 of the evaluation region 22 of the reference image and the evaluation region of the check image created for each print product to be verified. The reference pattern is used to make it possible to determine precisely the evaluation region within a check image and thus to also determine the exact position of the subsquares. This distinct pattern, of which the exact position relative to the evaluation region is known, is determined in the check image in order to align the evaluation region and thus also the subsquares thereto.

Thus both the similarity and the positional conformity of the individual print products are checked before they are introduced, for example, into a bookbinding machine, a collecting machine, a folding machine, a packaging machine or other machines for subsequent processing of print products. It is of decisive significance for this purpose that an optimum and as far as possible automatic teach-in process of the invention be provided that can keep pace with the machine cycle.

The invention claimed is:

1. A method for checking print products of the same kind which are transported by a conveying device, comprising:
   recording test images in a teach-in phase at a plurality of points on the print product using a digital camera;
   defining an evaluation region within each test image, which evaluation region is smaller than, or equal to, a size of the test image;
   analyzing characteristic information of each evaluation region;
   selecting the test image, in which the evaluation region with a most distinctive characteristic information is located, as a reference image; and
   checking subsequent print products of the same kind by recording at least one check image at a position corresponding to the reference image and by image-data comparison of at least one subregion of the check image with the evaluation region of the reference image;
   wherein, for ascertaining the reference image, the evaluation region is divided into a plurality of subregions, which are evaluated in terms of their characteristic information;
   wherein, for checking subsequent print products, a comparison of characteristic information of the subregions of the evaluation region of the reference image with corresponding subregions of the check image is carried out; and
   wherein the comparison is carried out for a number of subregions by correlation methods and for a number of subregions by comparing gray-scale mean values.

2. The method as defined in claim 1, wherein the print products of the same kind are printed sheets of paper of the same kind.

3. The method as defined in claim 1, wherein the subregions are analyzed in terms of their characteristic information by ascertaining at least one of: a number of edges and a contrast value of each subregion.

4. The method as defined in claim 3, wherein, when a threshold value for the number of edges in one of the subregions is not reached, a gray-scale mean value of the subregion is ascertained and registered.

5. The method as defined in claim 3, wherein the comparison by correlation methods or by comparison of the gray-scale mean values is carried out based on whether a threshold value for the number of edges is not reached.

6. The method as defined in claim 1, wherein the reference image comprises the test region having the evaluation region in which most subregions have a number of edges lying above a threshold value.

7. The method as defined in claim 1, wherein, in the evaluation region a reference pattern is determined, and wherein, for determining the reference pattern, a plurality of test patterns, which may overlap, is defined in the evaluation region and evaluated.

8. The method as defined in claim 7, wherein the reference pattern is differentiated from remaining evaluated test patterns in terms of an optimal number of edges at an optimal contrast value combined with unambiguity.

9. The method as defined in claim 1, wherein test images are produced using different exposure times or shutter times, and wherein, for optimizing the exposure time, at least one parameter is ascertained and evaluated for each image produced.

10. The method as defined in claim 9, wherein the at least one parameter comprises a histogram.

11. The method as defined in claim 1, wherein a barcode is provided on the print product, and wherein the reference pattern is selected to include the bar code.

12. The method as defined in claim 1, wherein the number and the position of possible test images on the print product are ascertained in a direction of transport such that a substantially symmetrical arrangement about a center of the print product is achieved.

13. The method as defined in claim 1, wherein, for aligning the evaluation region on a check image, the determined reference pattern is identified on the check image, and wherein the subregions to be examined of the check image are defined according to the position of the reference pattern.

14. A device for checking similar print products of the same kind, comprising:
   a digital camera for recording test images of a print product;
   an illuminating unit for illuminating the print product;
   an input for the supply of a position signal;
   a control and evaluation unit for controlling the digital camera and the illuminating unit and for analyzing image data produced by the digital camera;
   wherein the control and evaluation unit, the illuminating unit, and the digital camera, carry out a teach-in phase in which test images are recorded at a plurality of points on the print product using the digital camera;
   wherein the control and evaluation unit is further configured for:
      analyzing characteristic information in evaluation regions of the recorded test images;
      selecting a test image, comprising the evaluation region having the most distinctive characteristic information, as a reference image; and
      checking subsequent print products of the same kind by recording checking images at positions corresponding to the reference image and by comparing evaluation regions of the recorded check images with the image data of the evaluation region of the reference image;
   wherein a comparison of characteristic information of subregions of the evaluation region of the reference image with corresponding subregions of the check image is carried out, and the comparison is carried out for a number of subregions by correlation methods and for a number of subregions by comparing gray-scale mean values.

15. The device as defined in claim 14, wherein the print products of the same kind are printed sheets of paper of the same kind.

16. The device as defined in claim 14, further comprising:
a photoelectric barrier for detecting at least one of: a beginning and an end of the print product on the conveying device in a direction of transport.

17. The device as defined in claim 14, further comprising:
a press-down device for pressing the print product onto the conveying device at least in a region of the check image to be detected in an imaging area of the digital camera.

18. A computer program product having program code stored on a non-transitory computer-readable data medium and provided for carrying out the method steps of the method as defined in claim 1 when the computer program is executed on a logic device connected to the digital camera.

* * * * *